US011771266B2

(12) United States Patent
Larson

(10) Patent No.: US 11,771,266 B2
(45) Date of Patent: Oct. 3, 2023

(54) SPATULA DEVICE

(71) Applicant: Warren Larson, Alexandria, MN (US)

(72) Inventor: Warren Larson, Alexandria, MN (US)

( * ) Notice: Subject to any disclaimer, the term of this patent is extended or adjusted under 35 U.S.C. 154(b) by 67 days.

(21) Appl. No.: 17/531,977

(22) Filed: Nov. 22, 2021

(65) Prior Publication Data

US 2022/0408978 A1 Dec. 29, 2022

Related U.S. Application Data

(60) Provisional application No. 63/213,983, filed on Jun. 23, 2021.

(51) Int. Cl.
*A47J 43/28* (2006.01)
(52) U.S. Cl.
CPC .................... *A47J 43/288* (2013.01)
(58) Field of Classification Search
CPC ...................................... A47J 43/288
USPC ........................................... 30/169
See application file for complete search history.

(56) References Cited

U.S. PATENT DOCUMENTS

| 1,948,592 | A | * | 2/1934 | Nelson | A47G 21/045 294/7 |
|---|---|---|---|---|---|
| D619,429 | S | * | 7/2010 | Benfatti | D7/669 |
| 2005/0072006 | A1 | * | 4/2005 | Lee | E04F 21/165 30/169 |
| 2005/0173936 | A1 | * | 8/2005 | Lewis | A47J 43/288 294/7 |
| 2019/0200809 | A1 | * | 7/2019 | Leakey | A47J 43/288 |
| 2021/0022558 | A1 | * | 1/2021 | Han | A47J 43/288 |

\* cited by examiner

*Primary Examiner* — Phong H Nguyen
(74) *Attorney, Agent, or Firm* — Brennan, Manna & Diamond, LLC

(57) ABSTRACT

The present invention relates to an improved spatula device. The improved spatula device is designed to be placed in a baking pan before baking a food item, and is used to remove a first piece of a baked product or any other food item easily and conveniently from the baking pan, without damaging or disturbing other food items. The device includes a spatula portion, an elongated handle attached to the top edge of the spatula portion, and a flat and planar working end in the form of a planar surface extending perpendicularly from the bottom edge of the spatula portion. A piece of the baked batter or food item can be lifted easily, without disturbing nearby pieces, by lifting the improved spatula device using the handle. The improved spatula device can be used with any oven and any pan in which a batter, such as a cake batter, brownie batter or cookie batter is poured into the baking pan.

2 Claims, 7 Drawing Sheets

SPATULA DEVICE

CROSS-REFERENCE TO RELATED APPLICATION

The present application claims priority to, and the benefit of U.S. Provisional Application No. 63/213,983, which was filed on Jun. 23, 2021, and is incorporated herein by reference in its entirety.

FIELD OF THE INVENTION

The present invention relates generally to the field of cooking utensils. More specifically, the present invention relates to an improved spatula device for lifting a piece of food item from a baking pan or a grill without disturbing nearby pieces. The spatula device is designed to be placed in a baking pan and can be baked along with a food item. After baking the food item and cutting the food item into a plurality of pieces, the spatula can lift a piece of food item from the baking pan without disturbing nearby pieces of the food item. The spatula device has an elongated handle, a vertical spatula portion and a horizontal flat working end extending perpendicularly from a bottom edge of the vertical spatula portion. The flat working end can slide under a piece of food item and the spatula device is vertically lifted to remove the piece of food item. Accordingly, this disclosure makes specific reference thereto. Nonetheless, it is to be appreciated that aspects of the present invention are also equally applicable to other like applications, devices, and methods of manufacture.

BACKGROUND OF THE INVENTION

Both home and professional kitchens have a variety of culinary utensils for manipulating food items that may be prepared in cooking containers such as baking pans, griddles and grills. Spatulas are one culinary utensil commonly used to slide under a food item to move or lift the food item. In an effort to better support a food item on a spatula, a user may slide the spatula under the food item until the spatula contacts a wall of the cooking container, and thereby uses the wall of the cooking container to support the food item on the spatula. However, even with these additional efforts, conventional spatula designs tend to allow the food item to fall from the spatula, resulting in damage to the food item or other food items.

The problem is further exacerbated when food items like cakes, cookies, brownies, lasagna or other items that are prepared in a baking pan are baked and cut into pieces. While lifting such pieces using conventional spatulas, the nearby pieces of food items can be disturbed or damaged. Such incidents result in a waste of food and time, as a cook may have to replace or repair the damaged food item. As a result, many cooks desire a cooking utensil that can be used more effectively to remove baked items from containers such as baking pans.

Therefore, there exists a long-felt need in the art for an improved cooking utensil that can be used by both novice and professional cooks to remove a first piece and subsequent pieces of fully baked food items from a baking pan, grill or other surface without damaging nearby food items. Moreover, there is a long-felt need in the art for an improved cooking utensil that can be directly baked with a food item. Further, there is a long-felt need in the art for an improved cooking utensil that can be securely placed in a baking pan or on a grill. Finally, there is a long-felt need in the art for an improved cooking utensil that allows a cook to easily lift food items vertically from a baking pan, without damage to the food item lifted or nearby food items still in the baking pan, so as to produce and maintain a professional appearance to the food.

The subject matter disclosed and claimed herein, in one embodiment thereof, comprises a spatula device with a flat working end. The spatula device with the flat working end is configured to remove a piece of a food item without disturbing or damaging nearby pieces. The spatula device further comprises a vertical spatula portion having a top edge and a bottom edge, an ergonomic elongated handle attached to the top edge and a flat working end extending perpendicularly from the bottom edge that is integrally connected to the spatula portion along the bottom edge. The flat working end is planar, and is configured to be placed on a flat surface, such as on a baking pan surface underneath a food item that needs to be carefully lifted and handled. The spatula portion and the flat working end are made of thermally-resistant and rigid materials, thereby allowing the spatula device to be baked along with a food item.

In this manner, the novel spatula device of the present invention accomplishes all of the forgoing objectives, and provides an easy to use and convenient device to safely lift pieces of cut food items without damaging nearby pieces. The device allows the flat surface to slide under a food item and lift the food item vertically, to easily remove the desired piece from the baking surface without damaging other food items. The vertical spatula portion supports the lifted food item piece and prevents the piece from falling. The spatula device comes in a variety of sizes, and can be used by both novice and professional cooks in both home and commercial kitchens.

SUMMARY OF THE INVENTION

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a spatula device configured to remove a piece of food item without disturbing or damaging nearby pieces. The spatula device is comprised of a vertical spatula portion having a top edge and a bottom edge, an elongated handle attached to the top edge and a flat working end integrally-connected to the spatula portion along the bottom edge extending perpendicularly from the bottom edge. The flat working end is planar, and is configured to be placed on a flat surface such as on a baking pan surface underneath a food item. The elongated handle, the spatula portion and the flat working end are made of thermally-resistant and rigid materials, thereby allowing the spatula device to be baked along with a food item and/or used in a microwave. The handle portion may also be interchangeable with other spatula devices.

In another embodiment of the present invention, a novel spatula device is disclosed. The novel spatula device includes a spatula portion having a top edge and a bottom edge, an elongated handle is attached to the top edge and a flat and planar working end in the form of a planar surface extending perpendicularly from said bottom edge forming a ninety-degree angle between the spatula portion and the flat working end, wherein the flat working end is configured to be placed on a pan surface on which a batter or any food item is to be placed for baking. After baking the food item, a piece of the food item can be lifted easily using the handle of the spatula device to remove the food item without disturbing nearby pieces.

In yet another embodiment, a method for lifting one or more pieces of a food item from a surface without disturbing nearby pieces is described. The method includes the steps of providing a spatula device, the spatula device having a spatula portion and a flat working end, wherein the spatula portion is vertically-oriented and the flat working end is horizontally-oriented, placing the spatula device on a surface such as a baking pan, with the flat working end placed horizontally on the pan surface, and the spatula portion extending vertically upward from an edge of the working end, pouring a batter on the pan surface or placing a food item in the pan such that the flat working end lies underneath the poured batter or food item, placing the baking pan along with the placed spatula device in an oven for baking, removing the baking pan from the oven after baking, cutting the baked batter or food item into a plurality of pieces and lifting a first piece of food item placed on the flat working end by lifting the spatula device vertically, such that nearby pieces are not disturbed or damaged.

In yet another embodiment of the present invention, the method further comprises placing the flat working end on a baking surface and moving the flat working end on the surface, such that the flat working end moves underneath one or more selected pieces of a food items, such that the pieces of the food items are placed on the flat working end and supported by the spatula portion; and lastly, lifting selected pieces of food items from the baking surface.

In further embodiments of the invention, the thickness of the flat working end is in the range of 6-8 millimeters, the vertical spatula portion and the horizontal flat working end can have a coating of a non-stick material to prevent the food material from sticking to the spatula and the elongated handle can have an ergonomic grip. The spatula device can come in various sizes, and the vertical spatula portion can be in the form of a pentagon having two longitudinal edges, one lateral edge and a pair of tapered edges.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed, and are not intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
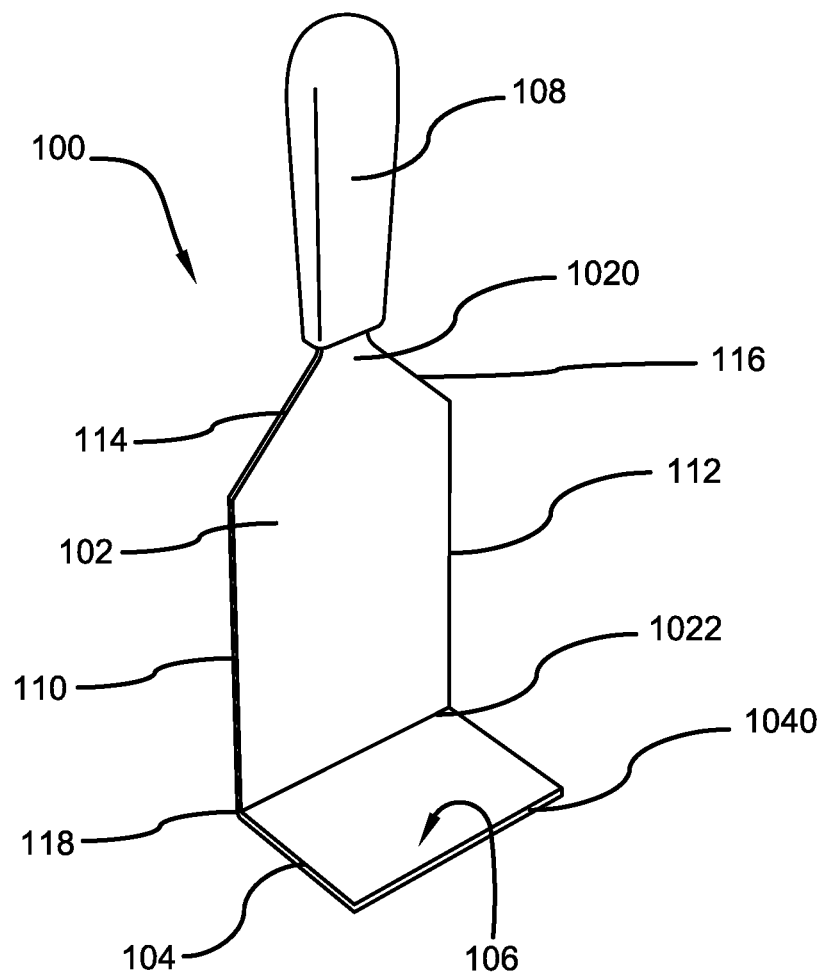
FIG. 1 illustrates a perspective view of one potential embodiment of an improved spatula device of the present invention for use in baking in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved cooking utensil that can be used by both novice and professional cooks to remove a first piece and subsequent pieces of fully baked food items from a baking pan or grill, without damaging nearby food items. Moreover, there is a long-felt need in the art for an improved cooking utensil that can be directly baked with a food item. Further, there is a long-felt need in the art for an improved cooking utensil that can be securely placed in a baking pan or on a grill. Finally, there is a long-felt need in the art for an improved cooking utensil that allows cooks to easily lift food items vertically from a baking pan without damage to the food item lifted or nearby food items still in the baking pan, so as to produce and maintain a professional appearance to the food.

The present invention, in one exemplary embodiment, is an improved spatula device. The novel spatula device includes a spatula portion having a top edge and a bottom edge, an elongated handle is attached to the top edge, a flat and planar working end in the form of a planar surface extends perpendicularly from said bottom edge, forming a ninety-degree angle between the spatula portion and the flat working end, wherein the flat working end is configured to be placed on a pan surface on which a batter or any food item is placed. After baking, the handle of the improved spatula can be used to easily lift a food item without disturbing the nearby pieces.

The improved spatula device can be used with any oven and any pan in which a batter such as a cake batter, brownie batter or cookie batter is poured, or any other food items such as lasagna, casseroles or the like are placed. The improved spatula device can be used in homes, restaurants, commercial kitchens or any setting where there is a need or desire to maintain a professional appearance to each piece of food item lifted out of a baking pan.

Referring initially to the drawings, FIG. 1 illustrates a perspective view of one potential embodiment of an improved spatula of the present invention for use in baking in accordance with the disclosed architecture. The improved spatula 100 is designed to be used in both commercial and personal kitchens by professional and amateur cooks. The improved spatula 100 is advantageous, as it can be baked directly in a pan 200 with a food item in an oven 304. More specifically, the spatula device 100 has a vertical spatula portion 102 having a top edge 1020 and a bottom edge 1022. The spatula portion 102 has a planar surface and has a pentagon shape with a first longitudinal edge 110 extending from a first tapered edge 114, and a second longitudinal edge 112 extending from a second tapered edge 116. The lateral bottom edge 1022 forms the trailing edge of the spatula portion 102, from which a flat working end 104 extends perpendicularly. The flat working end 104 is sharp, thin and rectangular in dimensions and extends perpendicular to the spatula portion 102. At the top edge 1020 of the spatula portion 102, an elongated handle 108 is attached that is used for handling and holding the spatula device 100.

The flat working end 104 is designed to be placed under a food item or a batter (before baking), such that a baked item is placed on the top surface 106 of the flat working end 104, and the food item is further supported by the spatula portion 102. The top surface 106 between the lateral bottom edge 1022 and the trailing edge 1040 securely lifts a food item piece when the handle 108 is used to lift the spatula device 100.

In the present embodiment, the elongated handle 108 and spatula portion 102 can either be formed as a single structure (e.g., a monolith) or as separate structures that fit together through molding or welding. Further, the flat working end 104 and the spatula portion 102 can either be formed as a single structure (e.g., a monolith) or as separate structures that fit together through molding or welding. The thickness of the spatula portion 102 can be equal to or greater than the thickness of the flat working end 104. Both the flat working end 104 and the spatula portion 102 are rigidly constructed of a heat-resistant, lightweight material. The elongated handle 108 can be made of various materials known in the art for use with kitchen utensils such as spatulas. The spatula device can be made of materials including, without limitation, stainless steel, synthetic polymers, thermoplastics, thermosets or wood that may be treated or coated. Further, both the flat end 104 and the spatula portion 102 can have a coating of a non-stick material, which can include polytetrafluoroethylene (PTFE).

In a further embodiment of the present invention, the flat working end 104 and the spatula portion 102 can be attached with a hinge 118, such as but not limited to a toggle hinge, which can allow the flat working end 104 to be either in a perpendicular orientation to the spatula portion 102, or allow the spatula portion 102 to be oriented at an alternative angle in the range of approximately 120 to 150 degrees, allowing the spatula device to be used as a conventional spatula.

The preferred dimensions of the flat working end 104 in the present embodiment are 90 millimeters (L)×50 millimeters (W)×6 millimeters (H). Alternatively, dimensions of the flat working end 104 in the present embodiment can be approximately 75 millimeters (L)×38 millimeters (W)×6 millimeters (H). However, it is appreciated that any dimension of any component of the device 100 may be as needed in any embodiment. The elongated handle 108 can be of varying lengths and shapes, as per the preferences of a user. In the present embodiment, the elongated handle 108 is an ergonomically-designed structure to fit comfortably in a user's hand. The elongated handle 108 can be of varying colors and aesthetic designs.

Figure 2:
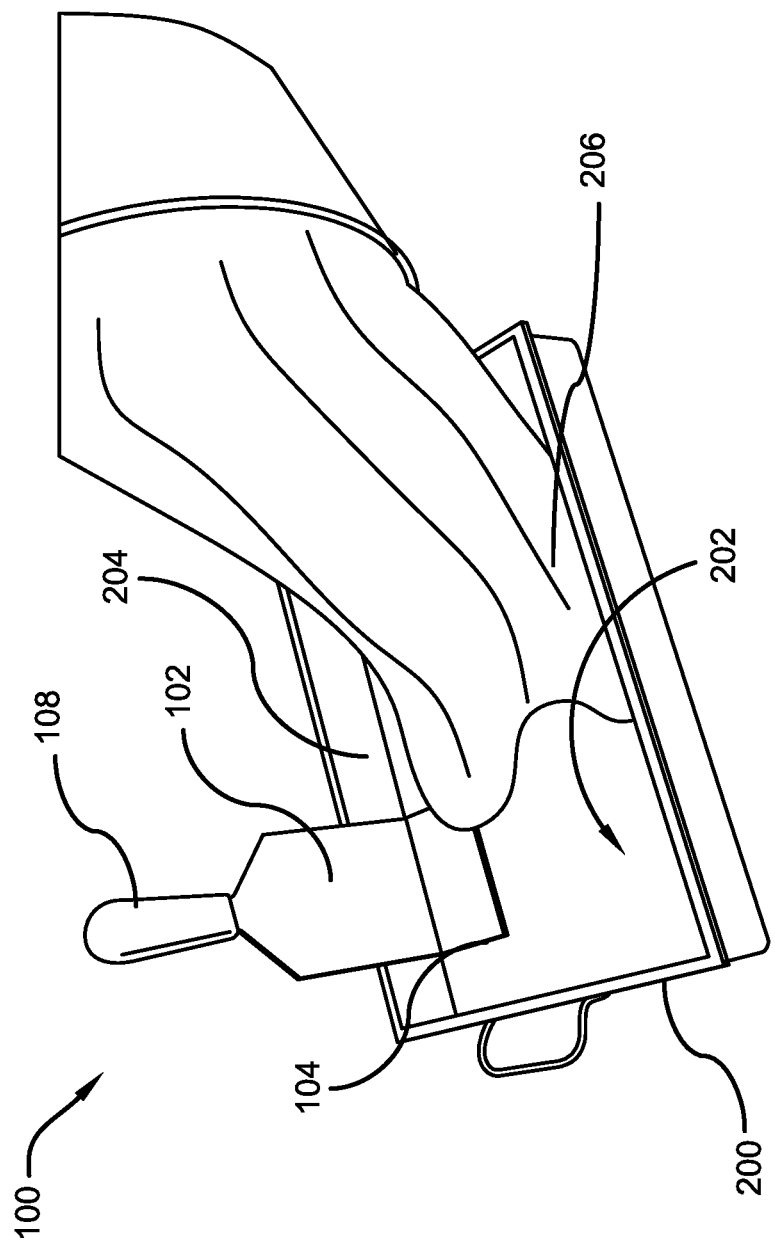
FIG. 2 illustrates a perspective view showing one potential embodiment of an improved spatula device of the present invention placed in a pan before pouring batter onto the flat working end in accordance with the disclosed architecture.

FIG. 2 illustrates a perspective view showing one potential embodiment of an improved spatula device 100 of the present invention placed in a pan 200 before pouring batter 206 onto the flat working end 104 in accordance with the disclosed architecture. The flat working end 104 of the spatula device 100 is placed on a surface 202 of a pan 200 at a desired location from where the first piece of a food item is to be removed. Preferably, the spatula device 100 is placed onto the surface 202, with the spatula portion 102 resting against one of the walls 204 extending from the surface 202 to provide stability when the batter 206 is poured into the pan 200 and onto the flat working end 104. The thin planar surface of the flat working end 104 allows the batter 206 to easily flow and accumulate on the flat working end 104, without breaking the uniformity and viscosity of the batter 206. The spatula device 100 can be easily controlled with the elongated handle 108. The perpendicular orientation of the flat working end 104 with respect to the spatula portion 102 allows a secure and stable placement of the spatula device 100 in the baking pan before placing the batter 206 in the baking pan.

Figure 3:
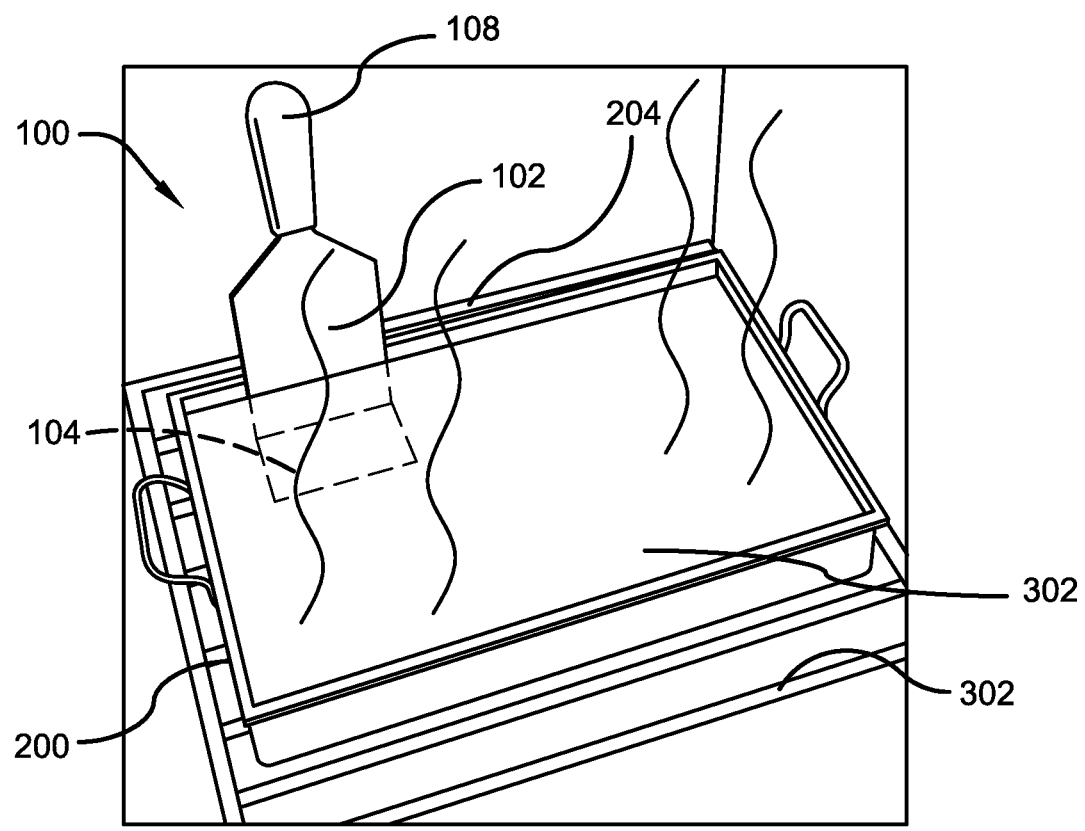
FIG. 3 illustrates a perspective view showing a food item being baked in an oven along with one potential embodiment of the improved spatula device of the present invention in accordance with the disclosed architecture.

FIG. 3 illustrates a perspective view showing a food item being baked in an oven 304, along with one potential embodiment of an improved spatula device 100 of the present invention in accordance with the disclosed architecture. As stated earlier, the spatula device 100 of the present invention can be baked directly into a pan 200 along with a food item such as the batter 302, such that a piece of the baked food item 302 placed on the flat working end 104 can be easily lifted, without disturbing or ruining the neighboring pieces. As shown, during baking in an oven 304, the spatula device 100 and the pan 200 are baked along with the food item 302, with the spatula portion 102 resting against the wall 204 of the pan 200. It should be noted that the flat working end 104 is underneath the batter 302 and does not hinder the baking process of the batter 302.

Depending on the size of the oven 304, the elongated handle 108 of the spatula device 100 can be provided in various sizes, including small, medium and large sizes. Also, various sizes help to accommodate all hand sizes, including male, female, adult, adolescent and child hand sizes. In one embodiment, the elongated handle 108 can be configured to detachably-snap on and off the spatula portion 102, allowing the handle to be detached while baking, and then reattached after baking. Detachability also allows for the use of various handles of different sizes and shapes to be used with the same improved spatula device for different cooking applications.

Figure 4:
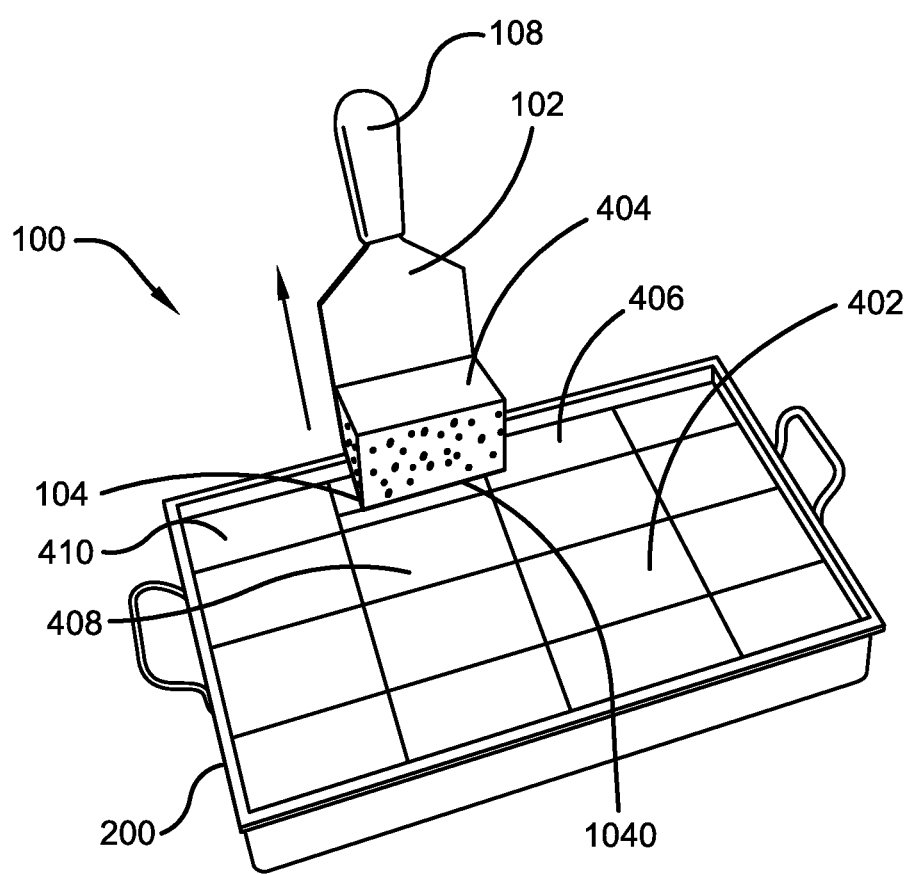
FIG. 4 illustrates a perspective view showing how a first piece of a food item is easily removed from the pan using one potential embodiment of the improved spatula device of the present invention in accordance with the disclosed architecture.

FIG. 4 illustrates a perspective view showing how a first piece of a food item 402 is easily removed from the pan 200 using one potential embodiment of an improved spatula device 100 of the present invention in accordance with the disclosed architecture. In operation, when a food item 402 is baked in the pan 200 and taken out of the oven 304, the food item 402 is cut into a plurality of pieces (shown exemplary as 404, 406, 408, 410) of desired sizes. Once the pieces are cut using any conventional tool such as a roller or a knife, a first piece 404 of food item 402 placed on the flat working end 104 of the spatula device 100 is lifted by lifting the device 100 using the handle 108, without disturbing or damaging the neighboring pieces 406, 408, 410. By holding the device 100 using the handle 108, the device 100 is lifted vertically without any horizontal movement, thereby preventing the trailing edge 1040 of the flat working end 104 from moving under any other piece of food item. After the first piece 404 of food item is removed, the flat working end 104 is pushed under other pieces of food items 402, such as one of the neighboring pieces 406, 408, 410, and is lifted vertically in a manner described above.

Figure 5:
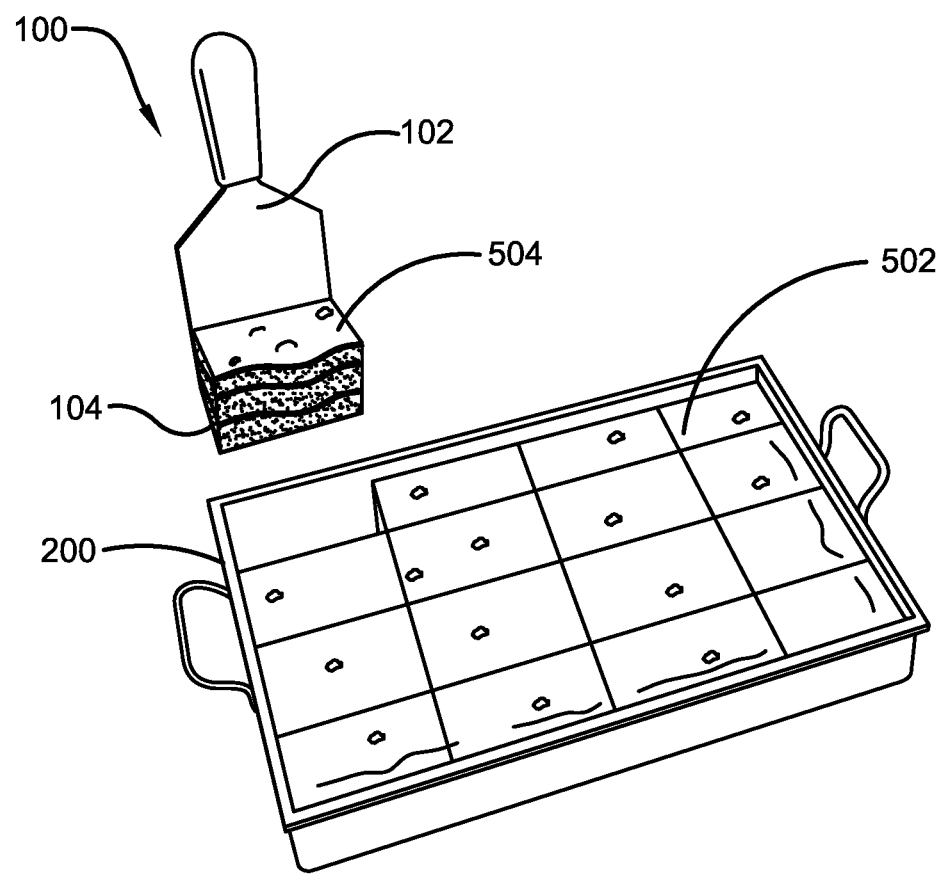
FIG. 5 illustrates a perspective view showing how a first piece of a lasagna is removed from the pan using one potential embodiment of the improved spatula device of the present invention in accordance with the disclosed architecture.

FIG. 5 illustrates a perspective view showing how a first piece of a lasagna 502 is removed from the pan 200 using one potential embodiment of the improved spatula device 100 of the present invention in accordance with the disclosed architecture. As shown, a first piece 504 from a plurality of pieces of any baked item, such as lasagna 502, baked in the pan 200 can be easily removed from the pan 200 by a user. The flat working end 104 is placed in the pan 200 before baking the lasagna 502, such that the lasagna 502 is placed over the flat working end 104. After the item is baked and cut into desired sizes, the first piece 504 is removed by vertically lifting the spatula device 100 with the first piece 504 resting on the flat working end 104 and supported by spatula portion 102.

Figure 6:
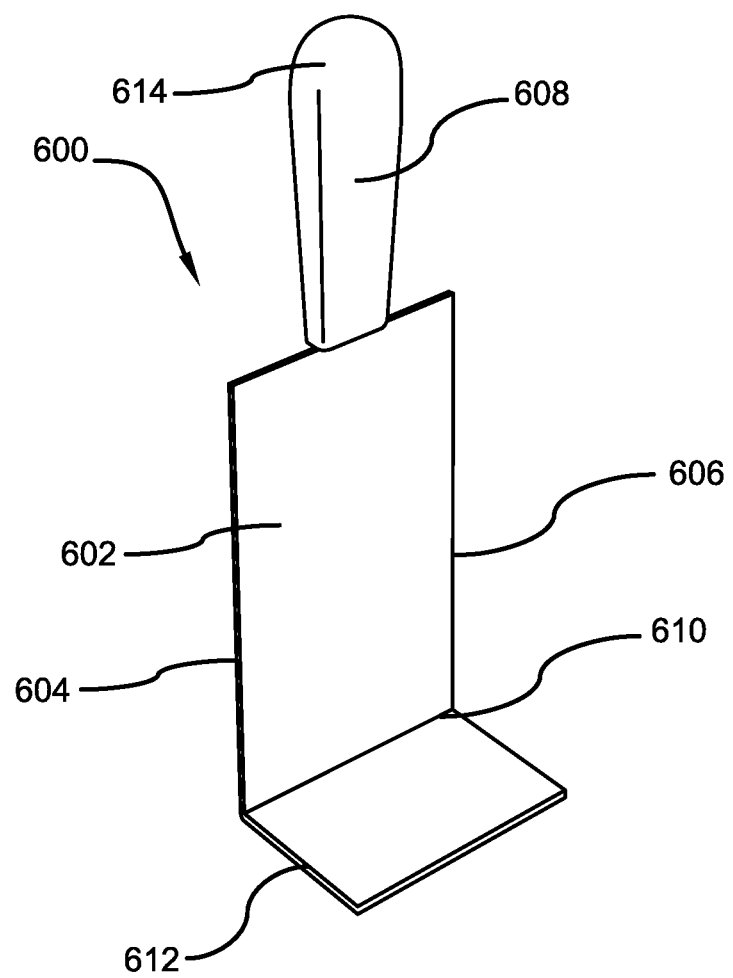
FIG. 6 illustrates a perspective view of one potential embodiment of the improved spatula of the present invention for use in baking in accordance with the disclosed architecture.

FIG. 6 illustrates a perspective view of another embodiment 600 of one potential embodiment of the improved spatula device 100 of the present invention for use in baking in accordance with the disclosed architecture. In the present embodiment, the spatula portion 602 is rectangular, having a pair of longitudinal edges 604, 606 and a pair of lateral edges 608, 610. An elongated handle 614 is attached to the top lateral edge 608 and a flat working edge 612 extends perpendicularly from the bottom lateral edge 610. The planar spatula portion 602 and the flat working edge 612 are formed as a single structure (e.g., a monolith). The dimensions of the flat working end 612 in the present embodiment are 90 millimeters (L)×50 millimeters (W)×6 millimeters (H). Alternatively, dimensions of the flat working end 612 in the present embodiment can be approximately 75 millimeters (L)×38 millimeters (W)×6 millimeters (H), or any other dimensions needed.

Figure 7:
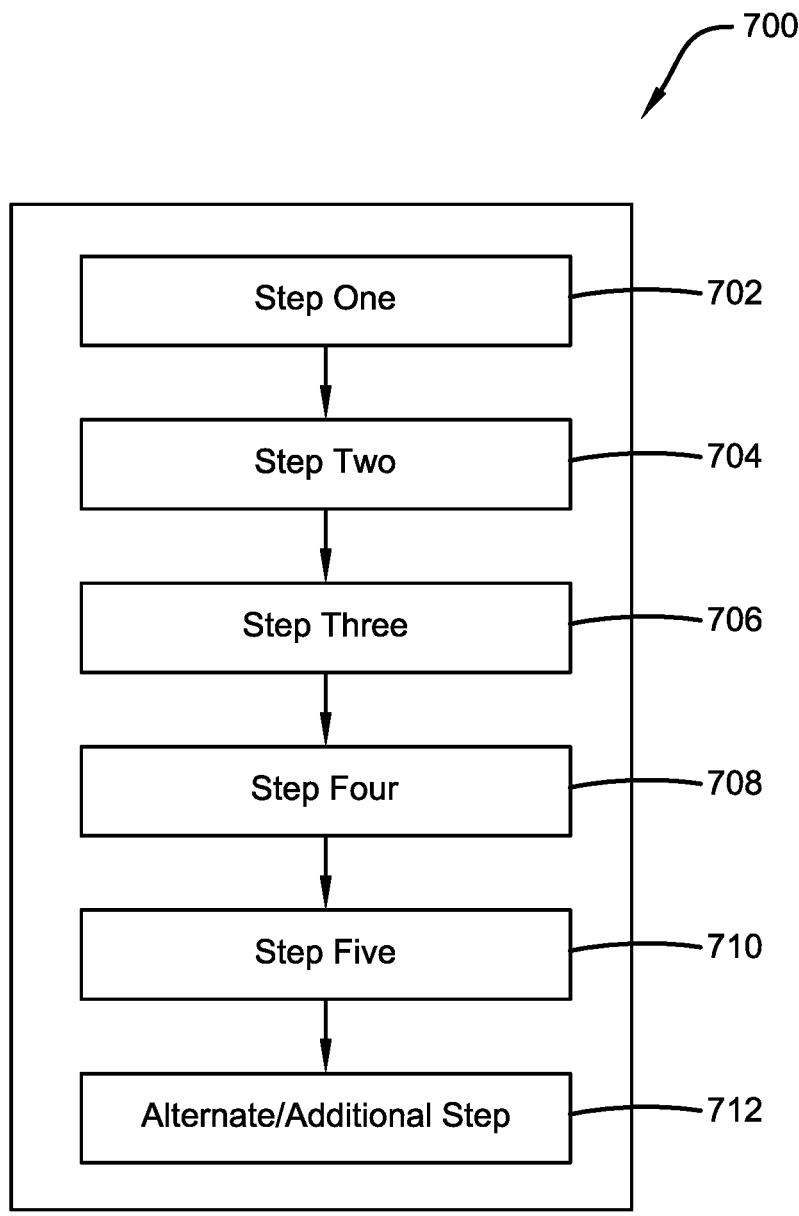
FIG. 7 illustrates a flow chart of a method of using one potential embodiment of the improved spatula of the present invention in accordance with the disclosed architecture.

FIG. 7 illustrates a flow chart of a method 700 of using one potential embodiment of the improved spatula 100 of the present invention in accordance with the disclosed architecture. The method 700 can be used to lift one or more pieces of a food item from a surface without disturbing nearby pieces. The method 700 first includes providing a spatula device, the spatula device having a spatula portion 102 and a flat working end 104, wherein the spatula portion 102 is vertically-oriented and the flat working end 104 is horizontally-oriented, and placing the spatula device 100 on a surface 202, such as a baking pan 200, with the flat working end placed horizontally on the pan surface and the spatula portion extending vertically upward from an edge of the working end (Block 702). Then, a user can pour a batter 206 on the pan surface 202 or place a food item 402 in the pan 200, such that the flat working end 104 lies underneath the poured batter 206 or food item 402 (Block 704). The user can then place the baking pan 200 along with the placed spatula device 100 in an oven 304 for baking (Block 706). Once baking is completed, a user can remove the baking pan 200 from the oven 304 and cut the baked batter 302 or food item 402 into a plurality of pieces 404, 406, 408, 410 (Block 708). Then, a user can lift a first piece 404 of a food item 402 placed on the flat working end 104 by lifting the spatula device 100 vertically, such that nearby pieces 406, 408, 410 are not disturbed or damaged (Block 710). The method 700 may further alternatively or additionally comprise placing the flat working end 104 on a baking surface 202 and moving the flat working end 104 on the surface 202, such that the flat working end 104 moves underneath one or more selected pieces 404, 406, 408, 410 of a food item 402, such that the pieces 404, 406, 408, 410 of the food item 402 are placed on the flat working end 104 and are supported by the spatula portion 102, to allow a user to lift the pieces 404, 406, 408, 410 of the food items 402 from the baking surface 202 (Block 712).

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "improved spatula device", "spatula device", "spatula", "device", and "spatula with flat working end" are interchangeable and refer to the spatula device with flat working end 100, 600 of the present invention.

Notwithstanding the forgoing, the spatula device with flat working end 100, 600 of the present invention can be of any suitable size and configuration as is known in the art without affecting the overall concept of the invention, provided it accomplishes the above-stated objectives. One of ordinary skill in the art will appreciate that the size, configuration and material of the spatula device 100, 600 as shown in the FIGS. are for illustrative purposes only, and that many other sizes and shapes of the spatula device 100, 600 are well within the scope of the present disclosure. Although the dimensions of the spatula device with flat working end 100, 600 are important design parameters for user convenience, the spatula device 100, 600 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for lifting one or more pieces of a food item from a surface without disturbing nearby pieces comprising the steps of:

providing a spatula device wherein the spatula device has a perpendicularly inclined spatula portion and a flat working end and placing the spatula device on a surface of a baking pan with the flat working end placed horizontally on the surface of the baking pan and the perpendicularly inclined spatula portion extending vertically above the pan surface of the baking pan from and resting on a wall of the baking pan;

pouring a batter in the baking pan surface or placing a food item in the pan such that the flat working end lies underneath the poured batter or food item;

placing the baking pan along with the placed spatula device into an oven for baking;

removing the baking pan from the oven after baking;

cutting the baked batter or food item into a plurality of pieces; and lifting a first piece placed on the flat working end by lifting the spatula device vertically such that nearby pieces are not disturbed.

2. The method for lifting one or more pieces of a food item from a surface without disturbing nearby pieces of claim 1 further comprising the steps of:

placing the flat working end on a surface of a baking pan wherein the baking pan has a plurality of pieces of a food item;

moving the flat working end underneath a selected number of pieces of the food item such that the selected pieces of the food item are placed on the flat working end and supported by the perpendicularly inclined spatula portion; and, lifting vertically the spatula device to remove the selected pieces of the food item from the surface of a baking pan without disturbing nearby pieces of food items.

* * * * *